United States Patent [19]
Lee

[11] Patent Number: 6,065,812
[45] Date of Patent: May 23, 2000

[54] BICYCLE WHEEL RIM CAPABLE OF COOPERATING WITH BRAKE SHOES TO BRING ABOUT SMOOTH AND STABLE BRAKING ACTION

[76] Inventor: Min-Hsiang Lee, 29, Lane Dong Lu, Chung Zhuang Village, Hua Tan, Chang Hua, Taiwan

[21] Appl. No.: 08/935,249

[22] Filed: Sep. 22, 1997

[51] Int. Cl.⁷ ...................................................... B60B 21/00
[52] U.S. Cl. ................................ 301/95; 301/97; 301/98; 301/6.9; 188/24.13
[58] Field of Search ................................ 301/95, 96, 97, 301/98, 6.9; 188/24.13, 24.12, 24.19

[56] References Cited

U.S. PATENT DOCUMENTS

| | | | |
|---|---|---|---|
| 3,305,048 | 2/1967 | Brilando | 188/343 |
| 3,433,327 | 3/1969 | Regis | 188/24.13 |
| 3,732,951 | 5/1973 | Hata et al. | 301/97 |
| 4,029,181 | 6/1977 | Lewis | 188/24.12 |
| 4,033,395 | 7/1977 | Berg et al. | 152/323 |
| 5,056,630 | 10/1991 | Fujii et al. | 301/95 |
| 5,499,864 | 3/1996 | Klein et al. | 301/97 |

*Primary Examiner*—D. Glenn Dayoan
*Assistant Examiner*—Long Bao Nguyen
*Attorney, Agent, or Firm*—Alan Kamrath; Oppenheimer, Wolff & Donnelly, LLP

[57] ABSTRACT

A bicycle wheel rim is composed of a friction surface extending along the rim. The friction surface is provided with a plurality of action units each having a primary action area and a secondary action area and a secondary action area. The primary action area has a flat surface capable of frictional engagement with the brake shoes of a bicycle brake system. The secondary action area has a concave surface capable of frictional engagement with the brake shoes of the bicycle brake system. The action units of the bicycle wheel rim are thus capable of cooperating with the brake shoes to bring about a smooth and stable braking action for slowing or stopping the bicycle wheel in motion.

3 Claims, 9 Drawing Sheets

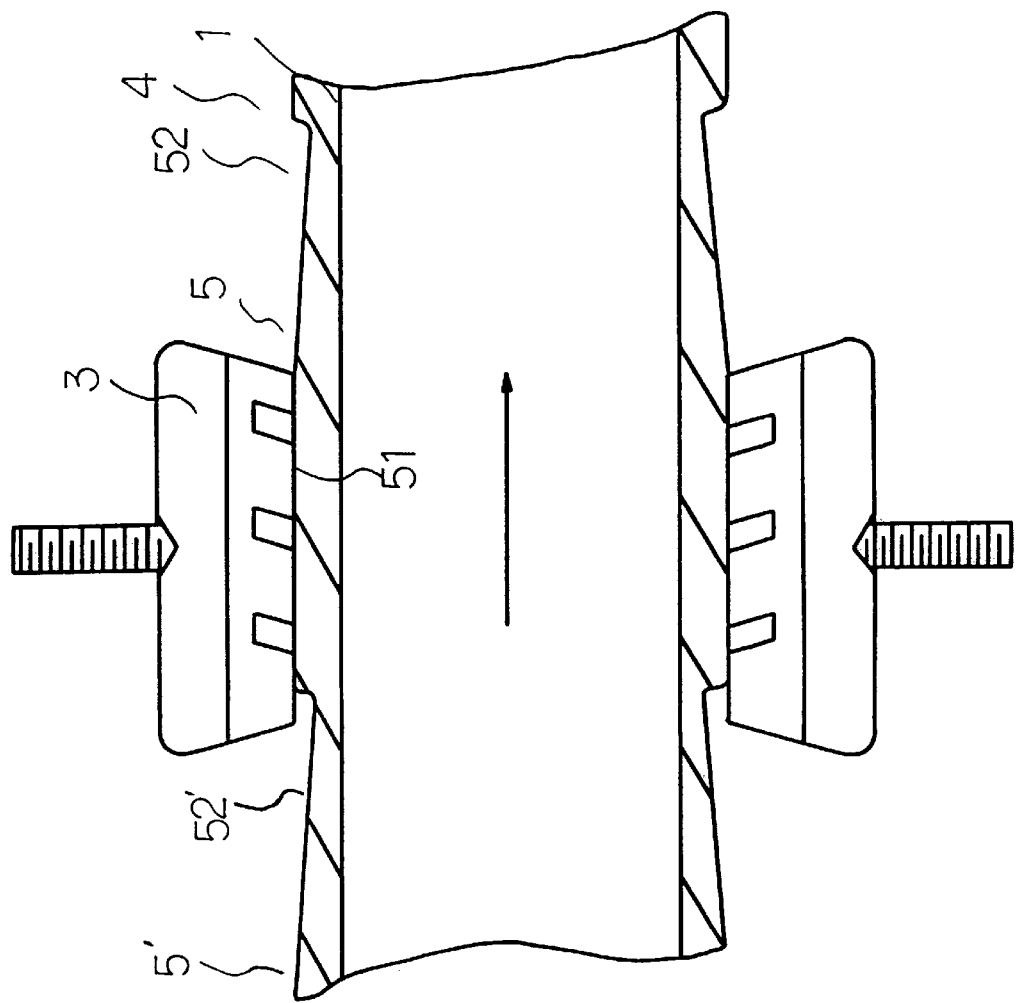

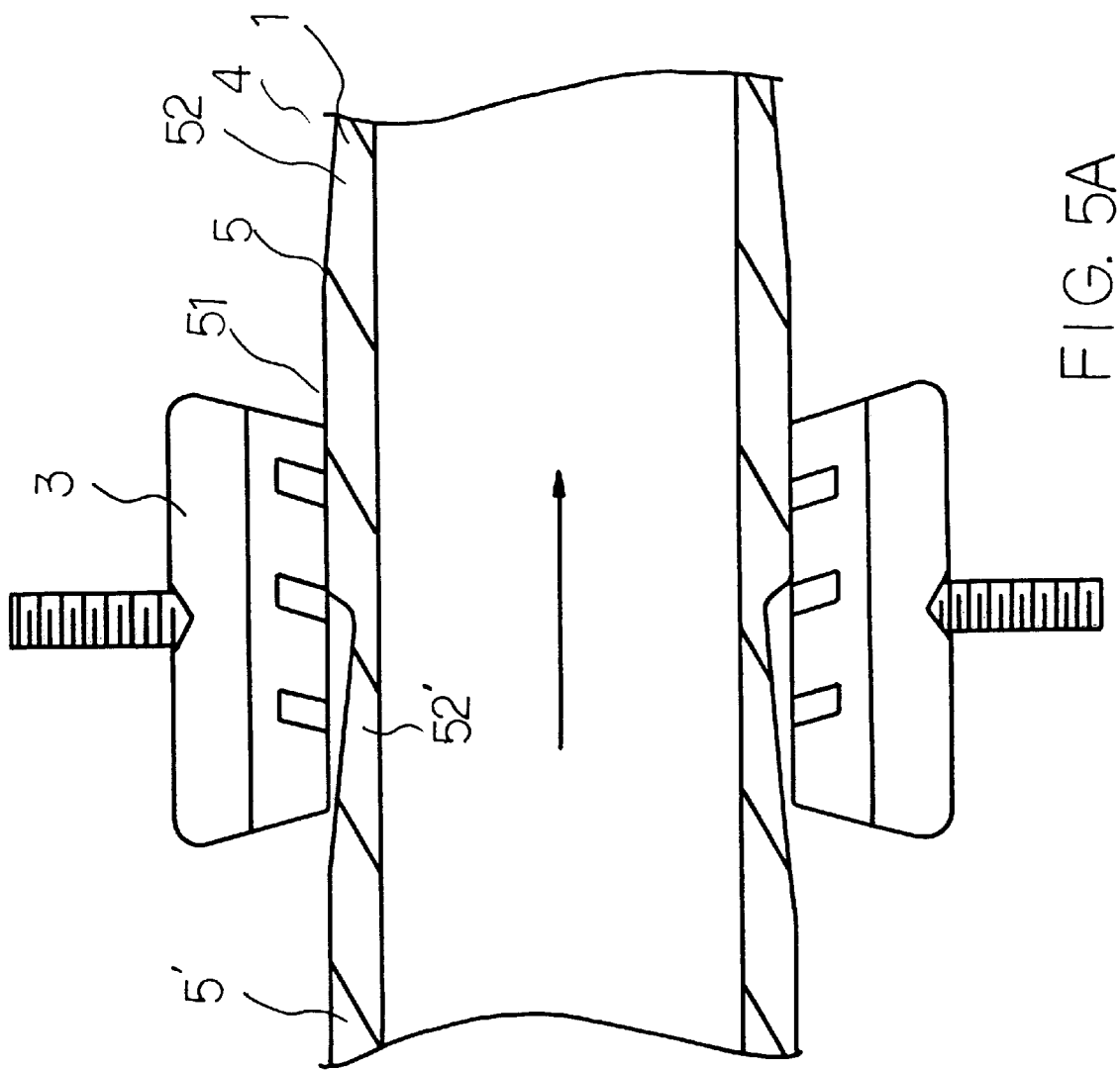

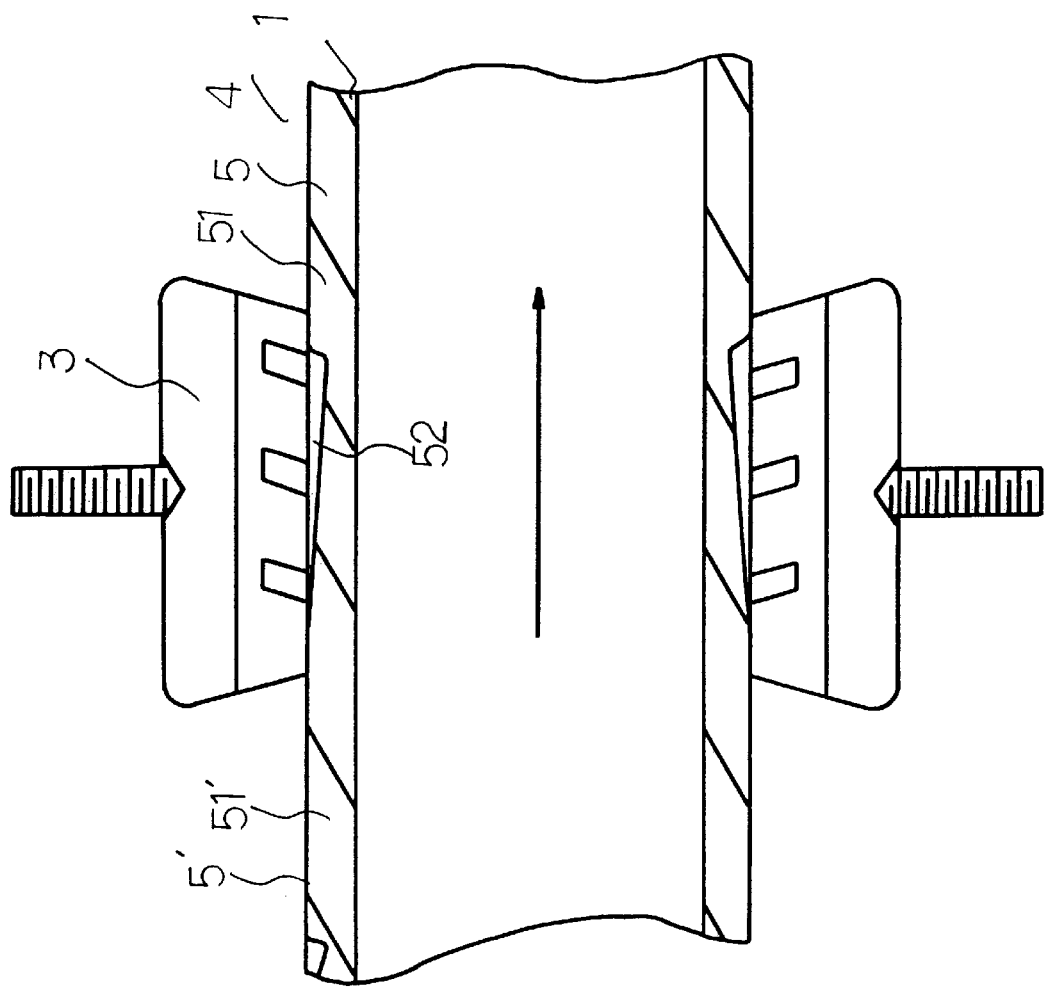

BICYCLE WHEEL RIM CAPABLE OF COOPERATING WITH BRAKE SHOES TO BRING ABOUT SMOOTH AND STABLE BRAKING ACTION

FIELD OF THE INVENTION

The present invention relates generally to a bicycle wheel rim, and more particularly to a bicycle wheel rim which is provided with means enabling the bicycle wheel rim to cooperate with the brake shoes to bring about a smooth and stable braking action for slowing or stopping the bicycle in motion safely.

BACKGROUND OF THE INVENTION

The conventional bicycle is generally provided with a brake system having two brake shoes which are capable of being actuated by the brake cable of the brake system to press against a wheel rim of the bicycle, so as to slow or stop the motion of the bicycle. The bicycle is rather vulnerable to overturn when the brake shoes are so actuated by the brake cable to press against the bicycle wheel rim in a hasty manner to bring the bicycle in motion to an abrupt halt. Needless to say, a bicyclist is therefore vulnerable to injuries when the overturn of the bicycle in motion takes place. Such an overturn incident of the bicycle is especially hazardous when the bicycle is in a downhill motion because of the motion inertia of the bicycle. Under such a downhill circumstance as described above, it is difficult for the bicyclist to manage to keep the rear wheel of the bicycle in a stable condition at such time when the braking action of the front wheel is triggered abruptly by the bicyclist. The solution to such a problem as described above is to apply the brake lever of the bicycle intermittently with skill.

SUMMARY OF THE INVENTION

The primary objective of the present invention is therefore to provide an improved bicycle wheel rim capable of overcoming the drawback relating to the brakinig action of the conventional bicycle wheel rim.

In keeping with the principle of the present invention, the foregoing objective of the present invention is attained by a bicycle wheel rim, which consists of a series of action units each having a primary action area and a secondary action area. The primary action area is provided with a flat contact area for making a full contact with the brake shoe, whereas the secondary action area is provided with an arcuate contact area smaller than the flat contact area of the primary action area. Both the primary action area and the secondary action area are slightly shorter than the brake shoe. The action units are arranged such that the primary action area of one action unit is contiguous to the secondary action area of another action unit, thereby averting an abrupt braking action on the bicycle wheel in motion at the time when the brake shoes are actuated by the brake cable to press against the wheel rim.

The foreaoing objective, features, functions, and advantages of the present invention will be more readily understood upon a thoughtful deliberation of the following detailed description of an embodiment of the present invention with reference to the accompanying drawings.

BRIEF DESCRIPTION OF THE DRAWINGS

FIG. 4-A shows another schematic view of the present invention at work.

FIG. 4-B shows still another schematic view of the present invention at work.

FIG. 5 showns a sectional view of the present invention at work.

FIG. 5-A shows another sectional view of the present invention at work.

FIG. 5-B shows still another sectional view of the present invention at work.

DETAILED DESCRIPTION OF THE EMBODIMENT

Figure 1:
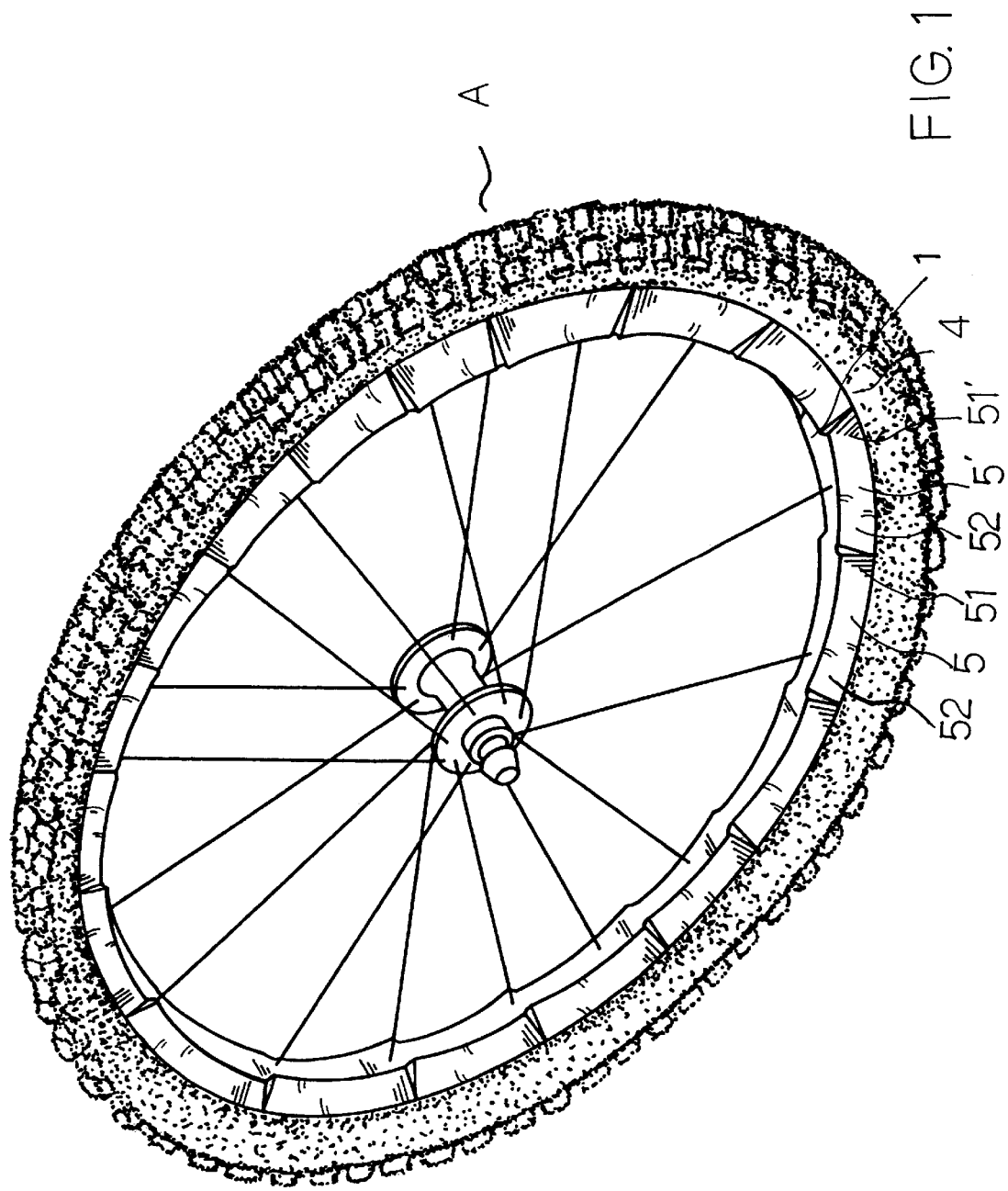
FIG. 1 shows a perspective view of a bicycle wheel rim of the present invention.
Figure 2:
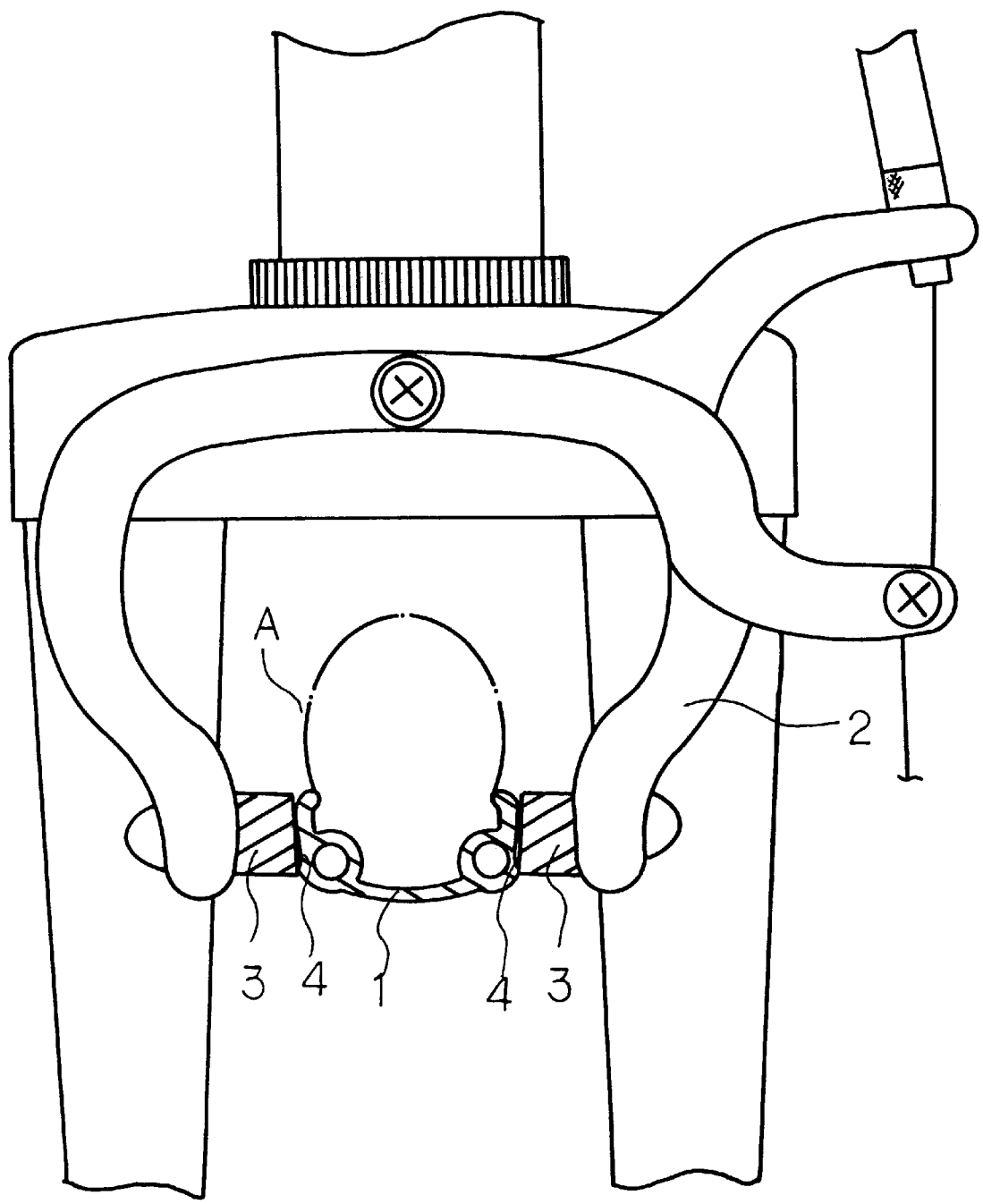
FIG. 2 shows a schematic view of the braking action of the present invention.
Figure 3:
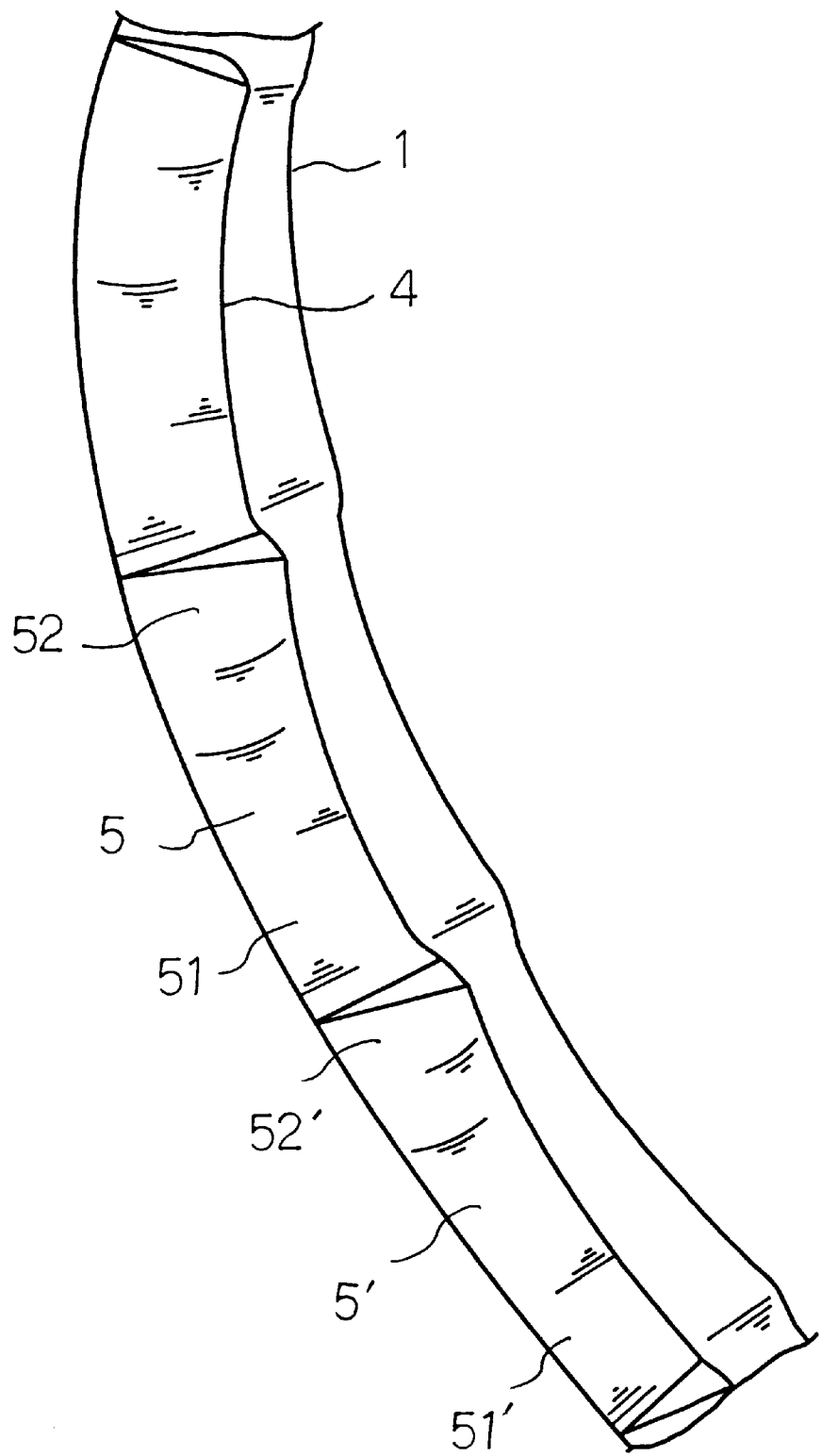
FIG. 3 shows a partial schematic view of the bicycle wheel rim of the present invention.

As shown in FIGS. 1, 2 and 3, a bicycle wheel "A" embodied in the present invention has a rim 1 which is provided with a friction surface 4 for making contact with a brake shoe 3 of a bicycle brake system 2. The friction surface 4 of the rim 1 consists of a series of action units 5 and 5'. Each of the action units 5 and 5' is composed of a primary action area 51, 51' and a secondary action area 52, 52'. The action units 5 and 5' are arranged such that the primary action area 51 of the action unit 5 is contiguous to the secondary action area 52' of another action unit 5'. The primary action area 51, 51' and the secondary action areas 52, 52' are slightly shorter than the brake shoe 3. The primary action area 51 of the action unit 5 is flat and capable of making a full contact with the brake shoe 3, whereas the secondary action area 52 has an inclined concave surface extending to the lower inner side of the rim 1 from the junction between the primary action area 51 and the secondary action area 52. It must be noted here that the inclined concave surface of the secondary action area 52 does not undermine the overall structural strength of the rim 1 It is shown in FIGS. 3 and 5-B that the secondary action area 52 has a contact area which becomes progressively smaller for making a functional contact with the brake shoe 3.

Figure 4:
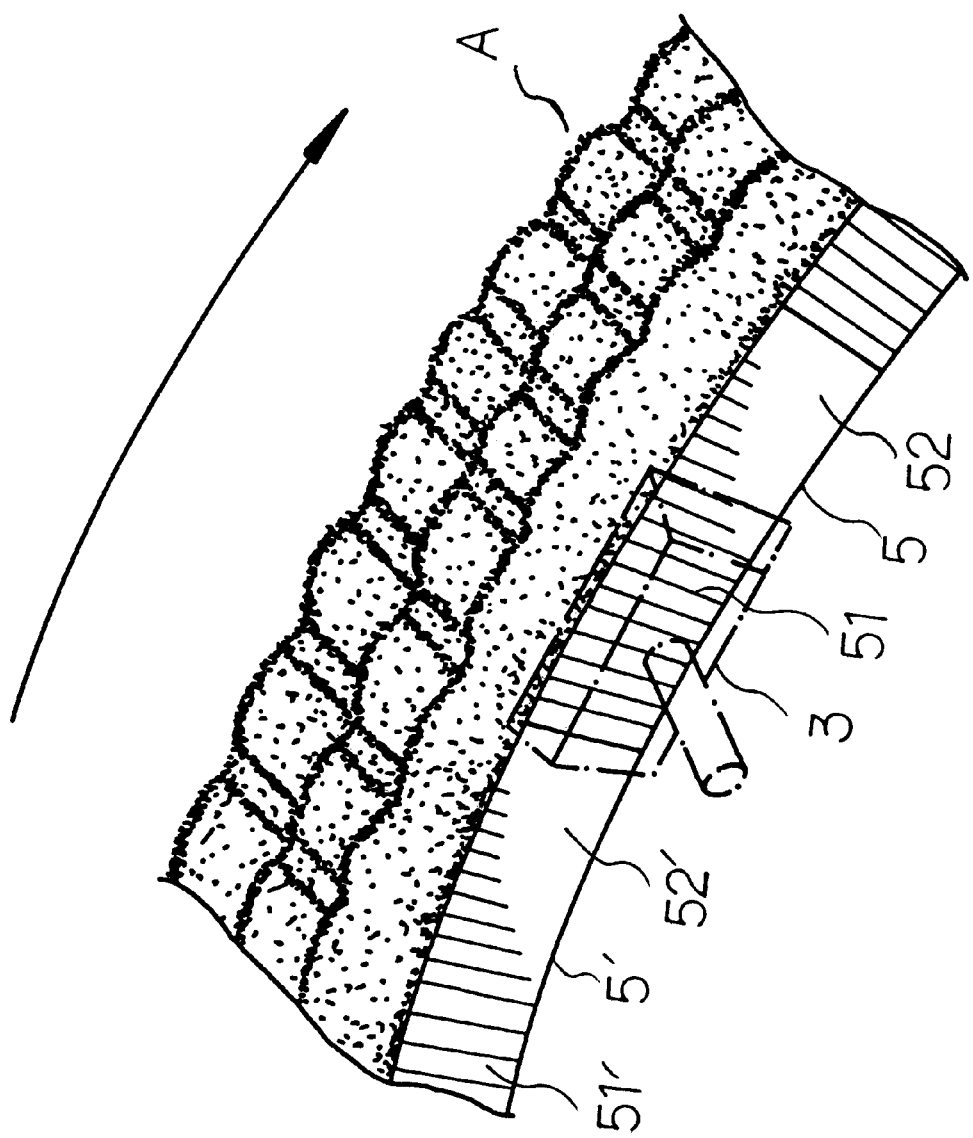
FIG. 4 shows a schematic view of the present invention at work.
Figure 4A:
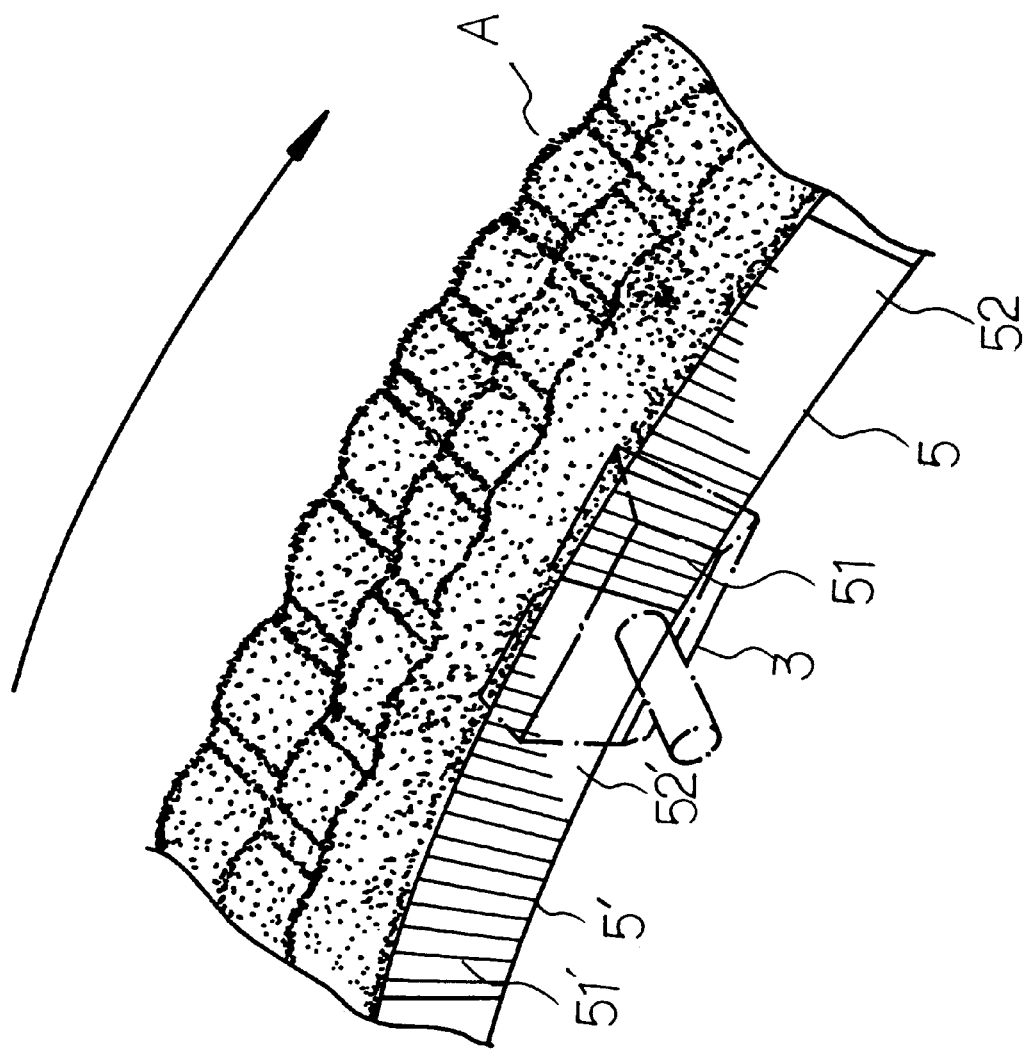
Figure 4B:
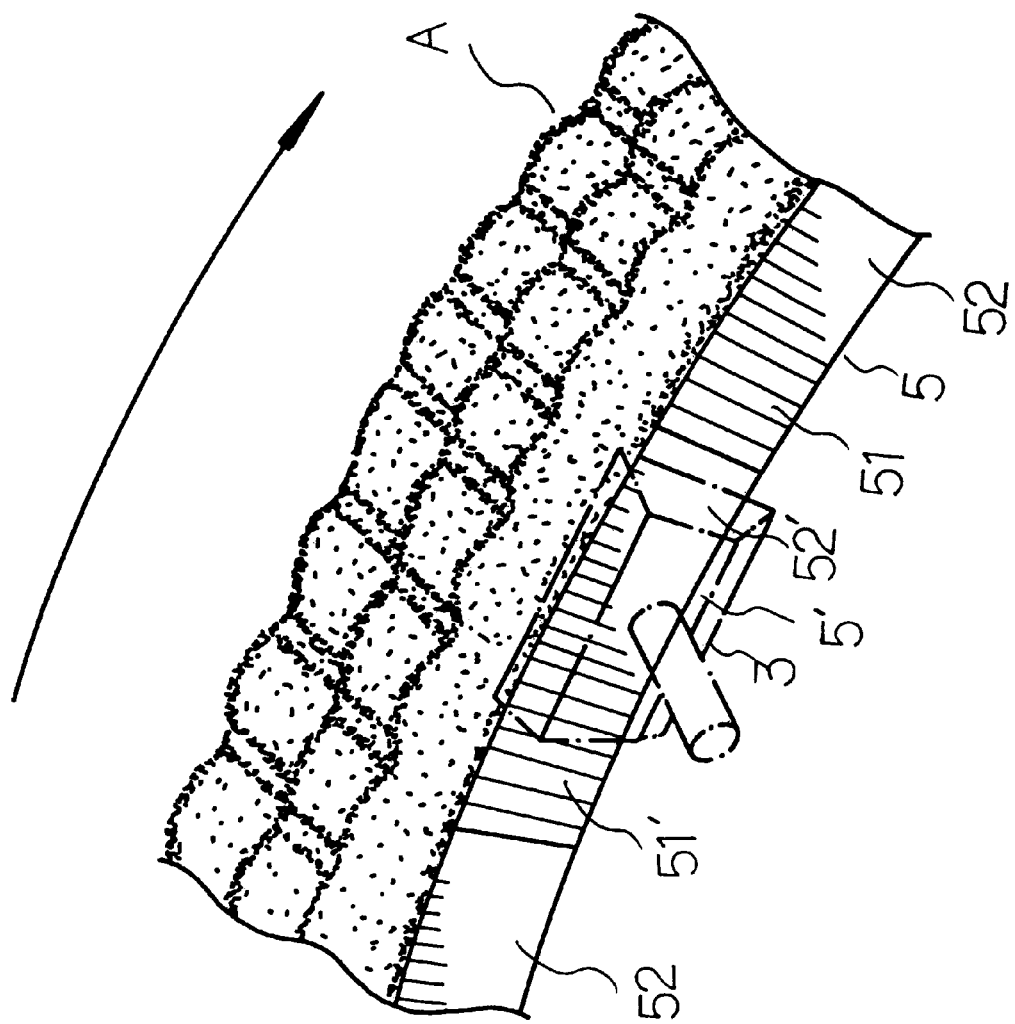

In operation, the brake shoes 3 of the bicycle brake system 2 are actuated to make a frictional contact with the friction surface 4 of the bicycle wheel rim 1 of a bicycle moving at normal speed. If the bicycle is operated at a high speed, an abrupt braking action results in the frictional contact of the brake shoe 3 with the primary action area 51 and the secondary action area 52 of the action units 5 in rotation. The greatest braking action is brought about at such time when the brake shoe 3 is engaged with the primary action area 51, as illustrated in FIGS. 4 and 5. On the other 5 hand, when the brake shoe 3 is making a frictional contact equally with both the primary action area 51 of the action unit 5 and the secondary action area 52' of the action unit 5', the frictional contact area between the brake shoe 3 and the friction surface 4 of the rim 1 is reduced in size, thereby resulting in a decrease in the braking action. When most area of the brake shoe 3 is engaged with the secondary action area 52' of the action unit 5', as shown in FIGS. 4-B and 5-B, the frictional contact area of the brake shoe 3 and the friction surface 4 of the rim 1 is the smallest, thereby resulting in the smallest braking action. In other words, the magnitude of the braking action of the brake shoe 3 becomes progressively smaller from the primary action area 51 of the action unit 5 towards the secondary action area 52' of the action unit 5'. As a result, the motion of the bicycle wheel "A" in motion is not stopped abruptly even if the bicyclist applies the brake lever of the brake system 2 abruptly.

Assuming that the bicycle wheel "A" is moving at the speed of 50 kilometers per hour or 14 meters per second, and that the bicycle wheel "A" has a circumference of 2 meters, and further that the bicycle wheel "A" rotates at the rate of 7 revolutions per second, and still further that it takes 0.1 second for the brake shoe 3 to bring the bicycle wheel "A" in motion to a complete halt, the rotational distance of the bicycle wheel "A" is 1.4 meters as the bicycle wheel "A" makes 0.7 revolution. If the rim 1 of the bicycle wheel "A" is provided with 20 action units 5, the brake shoe 3 must have made contact with 14 action units 5 when the bicycle wheel "A" has rotated for the distance of 1.4 meters. It is therefore readily apparent that the magnitude of the braking force of the brake shoe 3 acting on the rim 1 of the bicycle wheel "A" is changed intermittently throughout the entire braking process, even though the bicycle brake lever (not shown in the drawings) is triggered and kept at the "trigger" state persistently by the bicyclist.

As illustrated in FIGS. 5, 5-A and 5-B, the primary action area 51 and the secondary action area 52 of the action units 5 of the present invention have a length smaller than the length of the brake shoe 3. As a result, when one end of the brake shoe 3 is engaged with the primary action area 51 of the action unit 5, another end of the brake shoe 3 is already engaged with the primary action area 51' of another action unit 5'. For this reason, the brake shoe 3 is capable of making a stable frictional contact with the friction surface 4 of the wheel rim 1.

The secondary action area 52 of the action units 5 of the present invention is of a concave construction and is therefore capable of making use of the centrifugal force of the moving wheel to get rid of the rain water or the mud deposited on the surface of the secondary action area 52.

The embodiment of the present invention described above is to be regarded in all respects as being merely illustrative and not restrictive. Accordingly the present invention may be embodied in other specific forms without deviating from the spirit thereof. For examples the secondary action area 52 of the action units 5 of the present inventiont may be modified in form such that the secondary action area 52 is of a convex construction, or that the secondary action area 52 is irregularly concave and convex. The present invention is therefore to be limited only by the scopes of the following appended claims.

What is claimed is:

1. A rim of a bicycle wheel and capable of cooperatidg with brake shoes of a brake system of the bicycle to bring about a braking action for slowing or stopping the bicycle wheel in motion, said rim comprising a friction surface extending along said rim, said friction surface composed of a series of action units extending along said rim, with each action unit having a primary action area and a secondary action area, said primary action area provided witb a flat surface capable of frictional engagement with the brake shoes of the brake system of the bicycle and defining an outermost lateral extent of the bicycle rim friction surface, said secondary action areas being recessed from said primary action areas to alternate with said primary action areas to define an innermost lateral extent of the bicycle rim friction surface, said secondary action area provided with a concave surface capable of frictional engagement with the brake shoes of the brake system of the bicycle.

2. The rim as defined in claim 1, wherein said action units are arranged in said friction surface of said rim such that said primary action area of one of said action units is contiguous to said secondary action area of another one of said action units.

3. The rim as defined in claim 1, wherein said primary action area of each action unit and said secondary action area have a length smaller than a length of the brake shoes of the brake system of the bicycle.

* * * * *